Jan. 3, 1967   A. KATCHMAN   3,296,509
CAPACITOR WITH POLYPHENYLENE OXIDE DIELECTRIC
Filed Nov. 12, 1965

INVENTOR
ARTHUR KATCHMAN

BY *Harold A. Levey, Jr.*
ATTORNEY

3,296,509
CAPACITOR WITH POLYPHENYLENE OXIDE DIELECTRIC

Arthur Katchman, Glens Falls, N.Y., assignor to General Electric Company, a corporation of New York
Filed Nov. 12, 1965, Ser. No. 507,278
10 Claims. (Cl. 317—258)

The present invention relates to a dielectric material for electrical devices and more particularly to a dielectric material for electrical capacitors with improved dielectric constant.

With the continued miniaturization of electrical components, exhaustive efforts are being made to increase the capacitance of capacitors of a given size or to decrease the size of capacitors of a given capacitance. It is well known that the capacitance of a capacitor is directly proportional to the product of the dielectric constant of the dielectric material and the area of the capacitor plates and inversely proportional to the distance between the plates. Accordingly, increases in the capacitance must be provided by increasing the dielectric constant or by decreasing the distance between the capacitor plates or both in order to obtain higher values of capacitance without increasing the size of the capacitor.

The use of poly (2,6 dimethyl-p-phenylene ether) as a dielectric and more specifically as a dielectric film for electrical capacitors has been known in the prior art and has provided good results when used as a capacitor dielectric. However, capacitors using the above dielectric material are of larger size than those of the present invention.

In accordance with the present invention there is provided an electrical capacitor utilizing a poly (2,6 dimethyl-p-phenylene ether) which has been halogenated as the dielectric material. For example, brominated poly (2,6 dimethyl-p-phenylene ether) displays a much higher dielectric constant than the unbrominated material and allows for the production of capacitors of reduced size.

It is therefore an object of this invention to provide electrical devices having an improved dielectric material.

It is a further object of this invention to provide a dielectric material for electrical capacitors having a higher dielectric constant than similar prior art dielectric materials.

It is a still further object of this invention to provide a brominated polyphenylene ether dielectric material having increased dielectric constant.

It is a yet further object of this invention to provide capacitors having decreased volume per unit of capacitance.

With the above objects in view, the present invention relates to a new dielectric material for an electrical device and particularly for an electrical capacitor comprising a pair of spaced electrical conductors having interposed therebetween a film or layer of brominated polyphenylene ether.

The invention will be better understood from the following description taken in conjunction with the accompanying drawings, in which.

Figure 1:
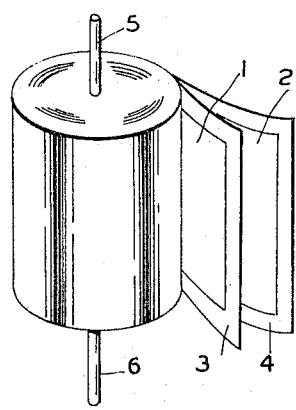
FIGURE 1 is a perspective view of a wound capacitor shown partly unrolled incorporating an improved dielectric material in accordance with the present invention.

It has been determined that the dielectric constant of polyphenylene oxide dielectric materials and particularly poly (2,6 dimethyl-p-phenylene ether) can be materially increased by halogenation of the polymer. The type of substitution can be predominantly side chain or nuclear, the substitution depending upon which of the particular known techniques of halogenation is utilized. Both side chain and nuclear halogenation result in a dielectric material having a higher dielectric constant than the unsubstituted polymer or original material. The nuclear substituted polyphenylene oxide dielectric is more stable and is therefore more suitable for use as a dielectric material.

A method of producing halomethyl-substituted polyphenylene ethers is fully set forth in the application of Allan S. Hay, Serial No. 155,827, filed November 29, 1961, assigned to the assignee of the present application. This application relates mainly to side-chain halogenation.

A capacitor was formed using side-chain halogenation in accordance with the following example:

EXAMPLE I 250 ml. of S-tetrachloroethane was added to 20 g. of poly (2,6-dimethyl-1,4-phenylene ether). The reaction mixture was brought to reflux temperature and then 10 g. (.063 mole) of bromine was added. Hydrogen bromide was evolved and the reaction was allowed to continue for an additional hour. The reaction mixture was colorless and the polymer was precipitated by the addition of methanol. The polymer was separated by filtration, dissolved in chloroform, filtered and reprecipitated in methanol. After drying at 90° C. in vacuo for three hours, there was obtained 18 g. of polymer, $|\eta|$ .84 dl/g. at 25° C. in chloroform containing 13.1% bromine.

A 1.2 mil film was prepared by solution casting the brominated polymer from chloroform solution. The film was metallized on both sides with a one inch circular gold electrode resulting in a capacitor having a capacitance of 464 picofarads at 27° C. and 60 cycles. The values for the dielectric constant of the unsubstituted and bromination sample at 60 cycles and 27° C. were 2.60 for the unsubstituted and 3.12 for the brominated polymer.

The above described brominated dielectric material was formed by a nuclear bromination as follows:

EXAMPLE II

A nuclear bromination was carried out by dissolving 20 grams of poly (2,6 dimethyl-p-phenylene ether) in 250 milliliters of carbon tetrachloride containing 0.5 milligram of pyridine. The solution was cooled in an icewater mixture and 63.9 grams of bromine (0.4 mol) was added rapidly. A vigorous initial reaction took place. After the vigorous initial reaction subsided, the reaction mixture was allowed to warm up to room temperature for sixty minutes and then heated at 60–70° C. for ninety minutes. The reaction mixture was filtered and the brominated polymer recovered by precipitation in methanol. There was obtained 19 grams of polymer containing 23.5% bromine.

Referring now to FIGURE 1, there is shown a roll type capacitor comprising a pair of convolutely wound electrodes foils 1 and 2 of suitable metals, such as aluminum, insulated from each other by separate films 3 and 4 of dielectric spacer material. In accordance with the present invention, the dielectric spacer material is comprised of halogenated poly-(2,6 dimethyl-p-phenylene ether). Terminal leads 5 and 6 are electrically connected to respective foil electrodes 1 and 2 and project from opposite ends of the wound capacitor section.

Figure 2:
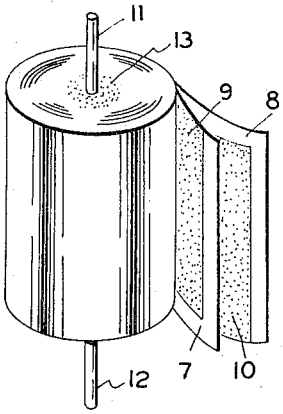
FIGURE 2 is a perspective view of a different embodiment of an electrical capacitor incorporating the improved dielectric material.

A different form of capacitor is shown in FIGURE 2. The capacitor there illustrated comprises a pair of convolutely wound dielectric films 7 and 8. The films 7 and 8 are similar to the dielectric films 3 and 4 of FIGURE 1, but have metallized coatings 9 and 10 respectively thereon serving as capacitor electrodes in lieu of the electrode foils 1 and 2 in FIGURE 1. As shown, a margin of unmetallized spacer material is left along one edge and the end of each of the dielectric films 7 and 8. By assembling the capacitor with the unmetallized edges of each of the dielectric films on opposite ends of the convolutely wound capacitor, the risk of short circuiting between the electrodes of opposite polarity is avoided. Electrical contact with each of the electrodes is also facilitated by the exposure of one electrode on each end of the convolutely wound capacitor. Terminals 11 and 12 are electrically connected to the metallized coating edges exposed at opposite ends of the roll by a metal connection 13 produced by a schooping, soldering, or other suitable process, as well known in the art.

Figure 3:
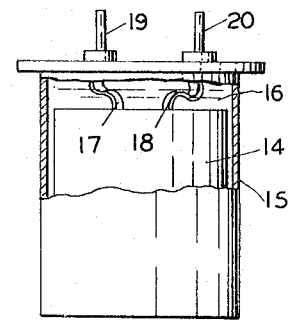
FIGURE 3 is an elevational view partly in section of still another form of an electrical capacitor in which the improved dielectric is incorporated.
Figure 4:
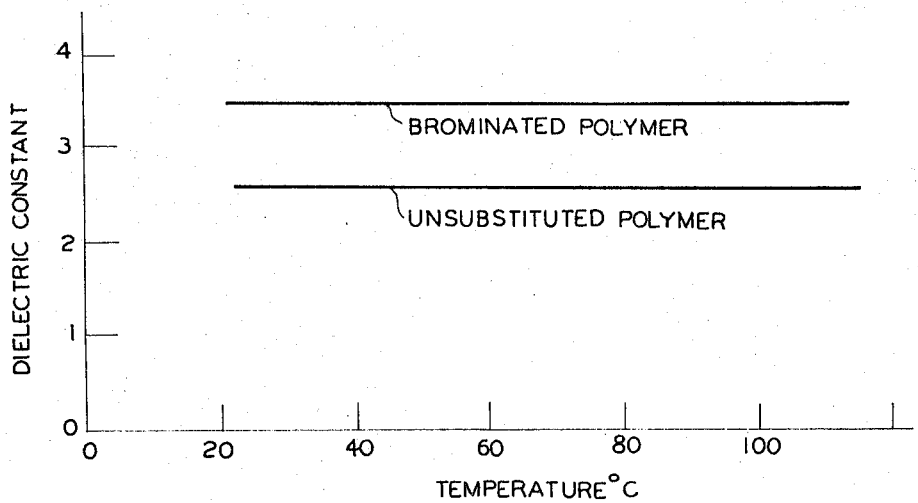
FIGURE 4 is a graph of dielectric constant for different temperatures for unsubstituted polyphenylene ether and for brominated polyphenylene ether.

FIGURE 3 shows a capacitor assembly in which a wound capacitor section 14, such as the wound section shown in FIGURES 1 and 2, is enclosed in a casing 15 containing a dielectric liquid, such as mineral oil, polymerized butenes, castor oil, silicone oil, or other suitable capacitor impregnating material. A pair of tap straps 17 and 18, connected within the capacitor section to electrodes of different polarity, are respectively connected to external terminals 19 and 20 suitably mounted on the cover of the casing.

Other forms of the present invention include the combination of a halogenated poly-(2,6 dimethyl-p-phenylene ether) dielectric material in film form with a separate sheet of a second dielectric material, such as kraft paper or mica paper. In another form, conventional capacitor dielectric spacer material, such as kraft paper, glass cloth, asbestos, or textile cloth, is impregnated or coated with high molecular weight halogenated poly-(2,6 dimethyl-p-phenylene ether). All of the various embodiments of the present invention described above, may be modified by the use of various fillers, such as finely divided aluminum oxide or a silica flour, in the halogenated poly-(2,6 dimethyl-p-phenylene ether) capacitor dielectric material.

In a specific laboratory embodiment a 1.1 mil film was prepared by solution casting the brominated polymer of Example II supra from a chloroform solution. The film was metallized on both sides with one inch circular gold electrodes, resulting in a capacitor having a capacitance of 561 picofarads. A 1.1 mil film was also prepared by solution casting the unsubstituted polymer from a chloroform solution and then metallizing the film with circular gold electrodes as with the brominated polymer. The capacitance of the resultant capacitor was 417 picofarads. A plot of the dielectric constant versus temperature for both the unsubstituted (lower curve) and brominated (upper curve) polymers is set forth in FIGURE 2 and indicates a dielectric constant value of 3.52 for the brominated polymer as compared with a dielectric constant value of 2.6 for the unsubstituted polymer over the temperature range measured.

The limits of bromination are essentially based upon the number of available positions for substitution. Thus, for nuclear substitution, bromine can be added only at $x$ and $y$.

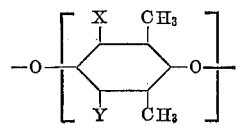

There are therefore only two available positions with a maximum of about 57% bromine possible in the nuclear substituted polymer. In the side chains there are six possible substitutions available, with a maximum bromine content of 81%. For nuclear bromination a range of bromine is possible of 0.5% to 57% with the most effective range being 10% to 30% bromine. In side chain bromination from about 0.5% to about 81% bromine is possible with the most effective range being 10% to 50% bromine.

While the present invention has been described with reference to a particular embodiment thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. Electrical apparatus comprising a pair of spaced electrical conductors and insulating material arranged therebetween, said insulating material comprising brominated poly (2,6-dimethyl-1,4-phenylene ether).

2. Electrical apparatus comprising a pair of spaced electrical conductors and insulating material arranged therebetween, said insulating material comprising nuclear brominated poly (2,6-dimethyl-1,4-phenylene ether) consisting of from about 0.5% to about 57% bromine.

3. Electrical apparatus as set forth in claim 2 wherein said ether consists of from about 10% to about 30% bromine.

4. Electrical apparatus comprising a pair of spaced electrical conductors and insulating material arranged therebetween, said insulating material comprising side-chain brominated poly (2,6-dimethyl-1,4-phenylene ether) containing from about 0.5% to about 81% bromine.

5. Electrical apparatus as set forth in claim 4 wherein said ether contains from about 10% to about 50% bromine.

6. Electrical apparatus as set forth in claim 1 wherein said ether contains from about 0.5% to about 81% bromine.

7. An electrical capacitor comprising a pair of spaced electrical conductors and insulating material arranged therebetween, said insulating material comprising brominated poly (2,6-dimethyl-1,4-phenylene ether).

8. An electrical capacitor as set forth in claim 7 wherein said ether consists of from about 0.5% to about 81% bromine.

9. An electrical capacitor, as in claim 7, wherein the dielectric material is a composite comprising, in addition to a film of brominated poly (2,6-dimethyl-1,4 phenylene ether), a liquid dielectric.

10. An electrical capacitor, as in claim 7, wherein the dielectric material is a composite comprising, in addition to a film of brominated poly (2,6-dimethyl-1,4 phenylene ether), a porous dielectric sheet material.

References Cited by the Examiner
UNITED STATES PATENTS
3,219,698   7/1966   Halpern _____ 266—47

LEWIS H. MYERS, *Primary Examiner.*

G. GOLDBERG, *Assistant Examiner.*